May 21, 1946.  W. McARTHUR  2,400,588
SEAT
Filed Nov. 19, 1943  2 Sheets-Sheet 1

Warren McArthur
INVENTOR

May 21, 1946.    W. McARTHUR    2,400,588
SEAT
Filed Nov. 19, 1943    2 Sheets-Sheet 2
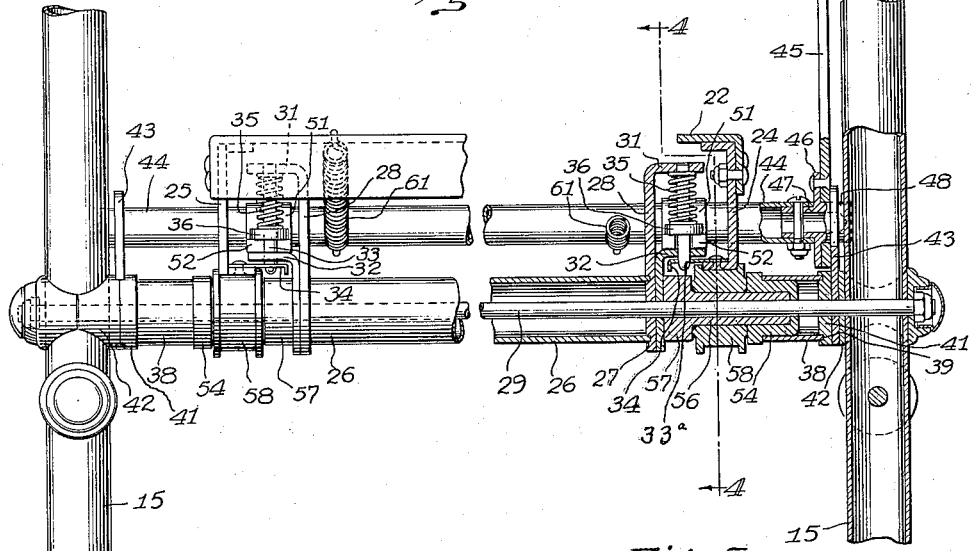
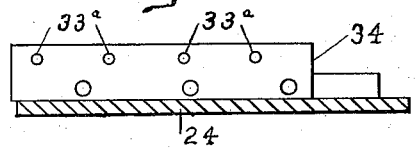
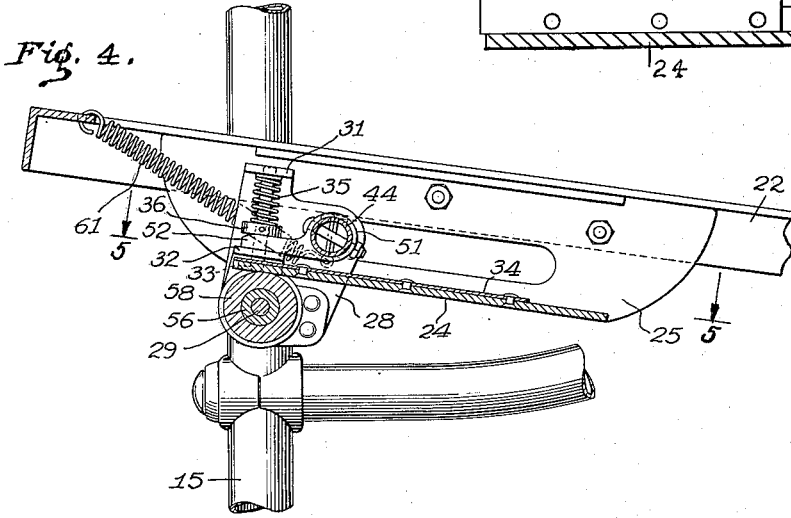
Warren McArthur
INVENTOR
BY
ATTORNEY Patented May 21, 1946

2,400,588

UNITED STATES PATENT OFFICE 2,400,588

SEAT

Warren McArthur, Bantam, Conn., assignor, by mesne assignments, to Reconstruction Finance Corporation, New York, N. Y., a corporation of the United States Application November 19, 1943, Serial No. 510,881

5 Claims. (Cl. 155—116)

This invention relates to seats such, for example, as vehicle seats used on airplanes, railway cars and other types of vehicles.

In seats of this type it is customary to provide an adjustable seat frame which can be moved by the occupant to a desired position and an object of this invention is to provide an adjustable seat having an improved locking mechanism constructed and arranged to retain the seat in the position desired and particularly adapted for use with seat and supporting frames of tubular construction.

Figure 1:
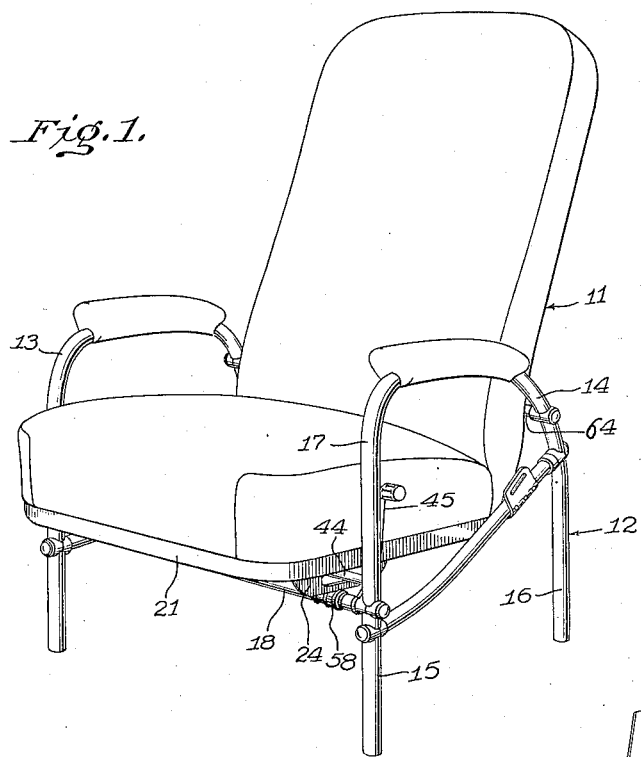
Figure 2:
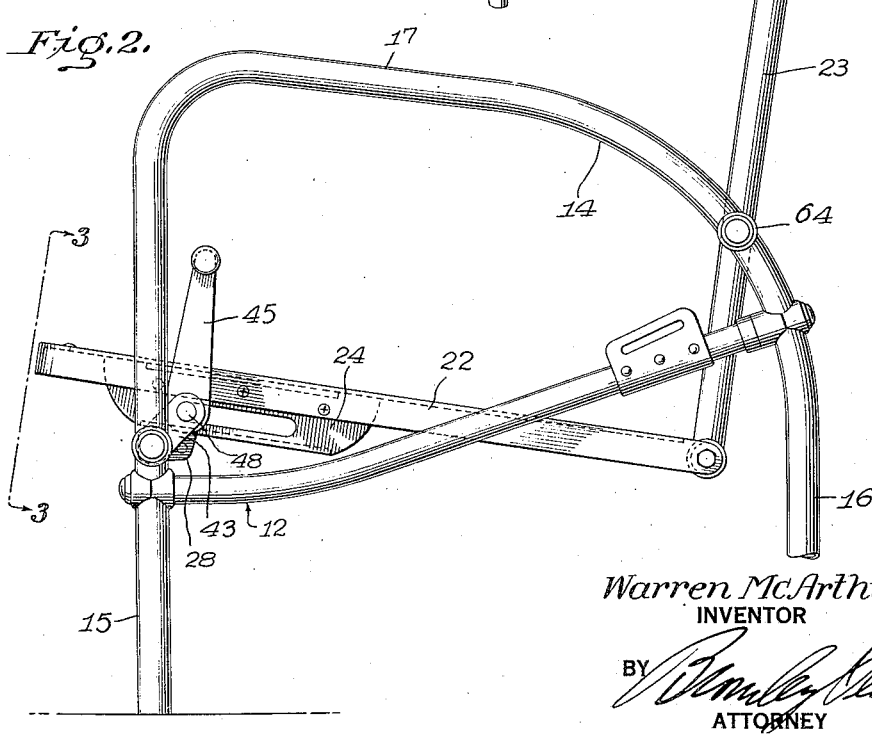

This and other objects which will be apparent are accomplished by the invention hereinafter described and illustrated in the accompanying drawings in which:

Fig. 1 is a perspective view of a seat constructed in accordance with one embodiment of this invention, Fig. 2 is a side elevation of a part of the supporting frame and of the seat and back frame shown in Fig. 1, the cushions having been removed, Fig. 3 is a front elevation, partly in section, looking from the left of Fig. 2 and at an angle indicated by the line 3—3 in Fig. 2, Fig. 4 is a section on the line 4—4 of Fig. 3, and Figure 5 is a plan section view along the line 5—5 in Figure 4, with parts omitted and particularly illustrating a perforate plate carried by the seat frame.

The present invention is illustrated in connection with a vehicle seat 11, having a supporting frame 12 comprising side frames 13 and 14 each formed by single tubular member shaped to form a front leg 15, rear leg 16, and connecting arm rest 17. The front legs are connected by a stretcher 18, constructed and arranged as hereinafter described.

A seat frame 21 formed by a substantially U-shaped angle bar 22 is hinged at its ends to a back frame formed by an inverted U-shaped tubular member 23, supported on pivot supports 64 to each side frame 13 and 14. The seat frame 22 is supported near the front on the front stretcher 18 by a pair of vertically disposed, slotted lock plates 24 and 25 secured, one to each side of the seat frame 22, the lower edge of the lock plate riding on the front stretcher. The stretcher 18 comprises a central tube 26, each end of which is supported and centered in an annular recess 27 formed in a bracket member 28 supported upon a inner rod 29 which extends through the stretcher and both front legs to tie the various parts together in the manner described, for example, in my Patent Number 2,303,308, granted November 24, 1942. Each bracket member 28 has spaced arms 31 and 32 in which a seat locking pin 33 is mounted for movement into and out of engagement with a plurality of perforations 33a in a plate 34 secured to the lower flange of the slotted locking plate 24. A coil spring 35 located between the upper bracket arm 31 and a washer 36 supported on each locking pin 33 normally presses the locking pin downwardly into locking engagement with a perforation in the locking plate.

At each end of the front stretcher 18, a tube 38 has its outer end centered and supported in an annular opening 39 in a washer 41 in turn centered and supported on the inner rod 29. An arcuate ledge washer 42, preferably of the type described in my Patent Number 2,323,829, granted July 6, 1943, is employed at each end of the stretcher to support a short bracket arm 43 adjacent each side of the supporting frame. A lock shaft 44 extends through the slots in the slotted seat supporting lock plates 24 and 25 and is rotatably supported in the bracket arms 43 at each end of the stretcher. A lock operating handle 45 positioned for easy accessibility to a passenger using the seat, is secured to a flange 46 formed on a plug 47 secured in the end of the lock shaft 44 and having an end extension 48 projecting through the bracket 43 for rotatably supporting the lock shaft therein.

Collars 51 are secured to the lock shaft and have bifurcated crank arms 52 engaging under the washers 36 for raising the lock pins out of engagement with the lock plates upon rotation of the lock shaft 44 by the handle 45.

The inner end of each tubular spacer 38 is supported on a flanged collar 54, in turn supported on one end of an elongated roller supporting plug 56 supported on the inner rod 29. The head 57 of the plug abuts the face of the lock pin supporting bracket 28. A seat frame supporting roller 58 on which the slotted lock plates 24 rest is rotatably mounted on the plug 56 between the head 57 and the flange of the collar 54. The roller 58 itself has an outer diameter corresponding substantially to that of the tube 26 while the inner diameter is considerably less being just enough to fit over the relatively small diameter plug 56. As a result, the frictional resistance to rotation of the roller is reduced to a minimum and any need for antifriction bearings is eliminated, while the construction eliminates also any sidewise movement of the roller. As a result the seat frame can be easily shifted from one position to another with little effort.

Because the lock shaft 44 extends through the slots of the locking plates 25 the seat frame is held against vertical displacement and is kept in position on the supporting rollers 58.

On the side of the seat opposite the handle 45, the lock shaft 44 extends through and is rotatably supported directly in the associated bracket 43.

It will be apparent that the front stretcher construction constitutes an integral sub-assembly which considerably simplifies and expedites the manufacture and assembly of the completed seat.

Springs 61 are connected between the front of the seat frame 21 and a frame part, such as the lock shaft, to tension the seat toward the front and facilitate adjusting movement by an occupant.

It will be apparent that the invention can be variously modified and adapted within the scope of the appended claims.

What is claimed is:

1. A seat comprising a support frame having a seat supporting stretcher, a seat frame adjustable horizontally and supported on said stretcher, a slotted plate secured to said seat frame, anti-friction means on said stretcher supporting said plate, and locking mechanism for locking said seat frame in adjusted position including a lock operating shaft supported on said stretcher, and extending through said plate, a locking pin adapted to engage in perforations formed in said plate, a bracket supported on said stretcher for mounting said pin, and means on said shaft for actuating said pin.

2. A seat comprising a support frame having a seat supporting stretcher, a seat frame adjustable horizontally and supported on said stretcher, a slotted plate secured to said seat frame, anti-friction means on said stretcher supporting said plate, and locking mechanism for locking said seat frame in adjusted position including a lock operating shaft extending through the slot in said plate, and shaft supporting brackets on said stretcher, a locking pin adapted to engage in perforations in said plate to secure said seat frame in adjusted position, pin holding arms on said bracket for holding and guiding said pin, a pin actuating crank on said lock shaft, and means for operating said shaft to release said plate from engagement by said pin to permit movement of said seat frame.

3. A seat comprising a support frame having a seat supporting tubular stretcher, an inner rod extending therethrough, a seat frame adjustable horizontally and supported on said stretcher, an anti-friction means for supporting said seat frame including a roller supported on said inner rod, and means for rotatably supporting said roller on said inner rod including a roller supporting sleeve of relatively small diameter on which said roller is mounted, a collar on said sleeve at one side of said roller, and a sleeve supporting plug having a collar at the other side of said roller.

4. A seat comprising a support frame having a seat supporting stretcher, a substantially horizontally adjustable seat frame supported on said stretcher, a locking mechanism for locking said seat frame against movement including a device secured to and movable with said seat frame and having a slot and a plurality of perforations formed therein, a rotary shaft extending through said slot, and means responsive to rotational movement of said shaft in opposite directions for alternately engaging and disengaging at least one of said perforations to respectively prevent and permit movement of said seat frame with respect to said support frame.

5. A seat comprising a support frame having a seat supporting stretcher, a substantially horizontally adjustable seat frame supported on said stretcher, a locking mechanism for locking said seat frame against movement including a device secured to said seat frame and movable therewith, said device comprising a downwardly projecting member and a laterally projecting member, respectively having a slot and a plurality of perforations formed therein, a rotary shaft extending through said slot, and means responsive to rotational movement of said shaft in opposite directions for alternately engaging and disengaging at least one of said perforations to respectively prevent and permit movement of said seat frame with respect to said support frame.

WARREN McARTHUR.